Aug. 12, 1969  F. J. CEPOLLINA  3,460,378
STRAIN GAUGE MEASURING TECHNIQUES
Filed July 20, 1966

INVENTOR,
FRANK J. CEPOLLINA

BY
ATTORNEYS

United States Patent Office 3,460,378
Patented Aug. 12, 1969

3,460,378
STRAIN GAUGE MEASURING TECHNIQUES
Frank J. Cepollina, Annandale, Va., assignor to the United States of America as represented by the Administrator of the National Aeronautics and Space Administration
Filed July 20, 1966, Ser. No. 566,717
Int. Cl. G01b 7/16
U.S. Cl. 73—88.5    2 Claims

ABSTRACT OF THE DISCLOSURE

A method for measuring strain, which method provides a simultaneous separate and independent measurement of the following parameters: elongations of specimens due solely to thermal stress; elongations of specimens due solely to mechanically induced stress; and elongations of specimens due to the combined effect of thermal and mechanically induced stress. The method calls for combining in a double bridge circuit, the outputs of an active strain gauge sensor, which sensor is both thermally and mechanically coupled to a test specimen, the outputs of a dummy sensor which is thermally and mechanically coupled to a supporting plate which plate is only thermally coupled to the specimen, and the outputs of a second dummy sensor which is directly thermally connected to the specimen.

---

The invention described herein was made by an employee of the United States Government and may be manufactured and used by or for the Government for governmental purposes without the payment of any royalties thereon or therefor.

The present invention relates to strain gauge measuring techniques and more particularly to strain gauge measuring techniques adapted to simultaneously obtain measurements at a plurality of points on a structurally complex specimen.

Thermally compensated bridge networks for measuring the elongation of a specimen due to mechanically induced stress, which include a pair of strain gauges and balancing resistors in the conjugate arms of the bridge, are well known in the art. In such networks the two strain gauges employed are commonly referred to as the active gauge and the dummy gauge. Conventionally, the active gauge is bonded to the specimen to be tested and the dummy gauge is bonded to a mechanically unstressed plate having substantially the same coefficient of thermal expansion as the specimen. In operation, the active gauge is exposed to both the thermally and mechanically induced strains of the specimen, while the dummy gauge is exposed only to the thermally induced strain of the plate, thereby permitting the effect due to the thermal environment of the specimen to be cancelled.

Numerous difficulties have been encountered in employing the above technique to study structurally complex specimens where it is desired to simultaneously obtain measurements or readings at a plurality of points. One such difficulty is the requirement that each of the dummy gauge supporting plates be of the same contour and be subjected to the same temperature conditions as the specimen at the points to be measured, thus requiring a complicated supporting means to physically position the plates adjacent to the specimen. Further, prior techniques have not been adapted to permit measurements of elongations due solely to thermal stress nor have they permitted separate and independent measurements of elongations due to thermal and mechanically induced stress at each point to be simultaneously obtained.

A recent development, as disclosed by Patent 3,116,469, represents a substantial improvement over the temperature compensated gauge techniques previously known in that it permits elongation due to mechanically induced stress to be simultaneously measured at a plurality of points on a specimen without the necessity of providing complicated devices to separately support the dummy gauge plates to each point to be measured. In this patent, an active and a dummy gauge are arranged in a T-design and mechanically bonded to a supporting plate, which in turn is mechanically bonded to the specimen at a point to be tested. However, in such a gauge arrangement the gauge mounting plate is permanently affixed to the specimen by means of welding or the like. Further, there is no suggestion of employing the gauge arrangement disclosed by this patent to directly measure thermally induced strains or to simultaneously obtain measurements of both thermally and mechanically induced strains.

Accordingly, it is an object of the present invention to provide a technique for measuring elongations of a structurally complex specimen due to thermally induced stress that is not subject to the disadvantages of the prior art.

It is a further object of the present invention to provide a strain gauge measuring technique which permits elongations due to thermal and mechanically induced stress to be simultaneously and independently measured at each point of the specimen to be studied.

These and other objects of the present invention will become apparent from the following specification taken with the accompanying drawings in which.

Figure 1:
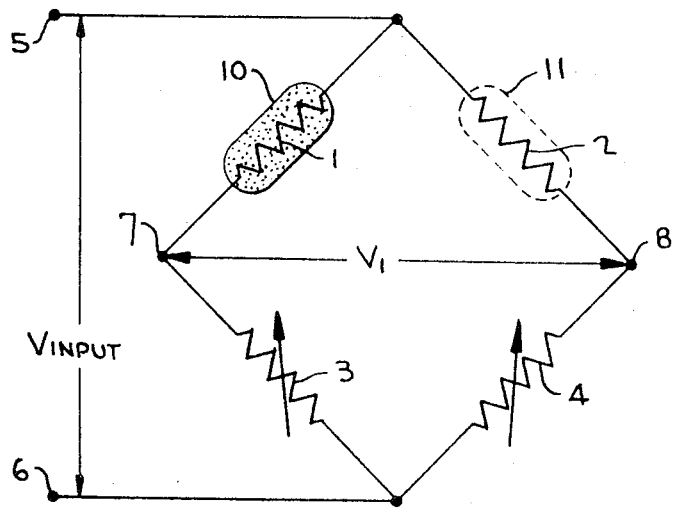
FIG. 1 illustrates the bridge network employed in the first embodiment of the present invention.

The technique of the first embodiment of the present invention will be discussed with reference to FIGS. 1 and 2. In FIG. 1 there is illustrated a conventional strain gauge bridge circuit, wherein an active gauge 1, a dummy gauge 2, and accompanying balancing resistors 3 and 4, respectively, are placed in the conjugate arms or parallel circuit paths of the bridge. Conventionally, the circuit is provided with a pair of input or excitation terminals 5 and 6, and a pair of output terminals, as at 7 and 8, disposed one in each conjugate arm.

In accordance with the practice of the first embodiment of the present invention, active gauge 1 is thermally and mechanically coupled to the surface of specimen 9, as indicated at 10, by any suitable thermally conductive adhesive, and dummy gauge 2 is thermally coupled to but mechanically isolated from specimen 9, as indicated at 11, by a material characterized by its high degree of plasticity. It will be appreciated that the materials employed to attach the dummy and active gauges to specimen 9 are chosen for their similar heat conductive characteristics. I have found that materials such as Eastman 910 Epoxy Adhesive Cement (manufactured by Eastman Kodak) and Dow Corning No. 7 Silicon Grease (manufactured by Dow Corning), respectively, are suitable for attaching the active and dummy gauges to the specimen.

Figure 2:
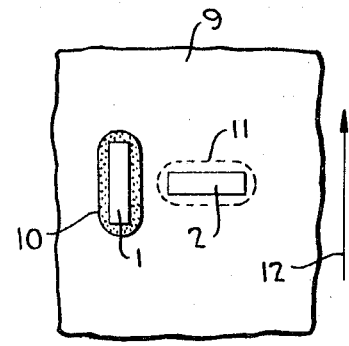
FIG. 2 is a diagrammatic view of the strain gauges employed in the network illustrated in FIG. 1 and showing their relative placement on a specimen to be tested.

Referring to FIG. 2, it will be seen that active gauge 1 and dummy gauge 2 are mounted on the specimen 9 to be tested in a generally T-shaped configuration, and that the principal axis of expansion and contraction of active gauge 1 is disposed in alignment with the axis 12 of the thermally induced elongation to be measured. It will be appreciated that the arrangement of dummy gauge 2 shown in FIG. 2 is preferred in those instances where the principal axis of elongation of specimen 9 due to thermally induced stress is aligned with axis 12, since the possibility of dummy gauge 2 sensing elongation of specimen 9 along axis 12 is minimized.

By mounting gauge 2 in the manner described, it will be seen that any expansion or contraction of the specimen due to temperature is not mechanically coupled to, and accordingly not sensed by the dummy gauge; however the dummy gauge will undergo thermal expansion or contraction as a function of its temperature, which elongation is at the same rate as the adjacently disposed active gauge since it is experiencing this same thermal environment. Accordingly, by utilizing the active-dummy strain gauge technique in accordance with the first embodiment of the present invention, only the actual resulting elongations of the test specimen will be sensed by the bridge work, in the form of output voltage $V_1$, since dummy gauge 2 acts to cancel effects due to change in electrical resistance of active gauge 1 caused by the changing thermal environment.

It will be apparent that the utility of the first embodiment of the present invention is restricted to cases wherein the specimen being tested is subjected to a changing thermal environment in the absence of changing mechanically induced stress, in that active gauge 1 is unable to discern between thermally and mechanically induced elongations. Accordingly, for those instances where it is desired to both simultaneously and independently determine elongations due to thermally and mechanically induced stress, I have devised a second technique which will be discussed with reference to FIGS. 2 and 3.

Figure 3:
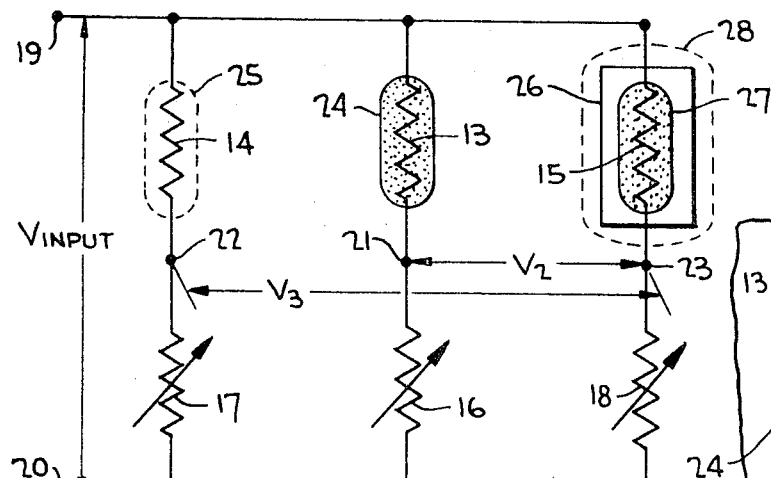
FIG. 3 illustrates a double bridge circuit employed in the second embodiment of the present invention.

In FIG. 3 there is illustrated a double bridge circuit having in the parallel circuit paths thereof an active gauge 13, a pair of dummy gauges 14 and 15, and accompanying balancing resistors 16, 17 and 18. The bridge network is further provided with input terminals 19 and 20 and a plurality of output terminals 21, 22 and 23 disposed in the circuit paths of gauges 13, 14 and 15, respectively. As in the case of the first embodiment of the present invention, illustrated in FIGS. 1 and 2, active gauge 13 is thermally and mechanically coupled to the surface of specimen 9, as indicated at 24, by a thermally conductive cement, and the dummy gauge 14 is thermally coupled to but mechanically isolated from the surface of specimen 9, as indicated at 25, by a thermally conductive material characterized by a high degree of plasticity.

From viewing FIGS. 2 and 3, it will be apparent that the bridge circuit of the second embodiment of the present invention differs from the embodiment illustrated in FIGS. 1 and 2 principally in the provision of the second dummy gauge 15. In the practice of the second embodiment of the present invention dummy gauge 15 is thermally and mechanically coupled to a supporting strip or plate 26 by any suitable thermally conductive adhesive, as indicated at 27, and the strip 26 is thermally coupled to the surface of specimen 9, as indicated at 28, by a thermally conductive material characterized by a high degree of plasticity. It will be understood that the coefficient of thermal expansion of strip 26 is identical to that of the specimen to be tested, that dummy gauge 15 is thermally and mechanically coupled to strip 26 by the same material employed to couple active gauge 13 to the surface of specimen 9, and that strip 26 is thermally coupled to the surface of specimen 9 by the same material employed to couple dummy gauge 14 to such surface.

Figure 4:
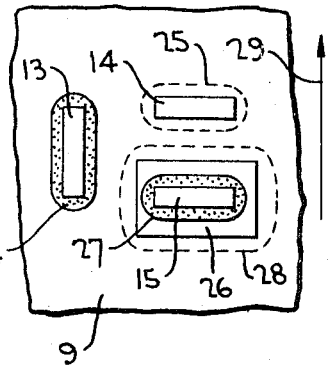
FIG. 4 is a diagrammatic view of the strain gauges employed in the network illustrated in FIG. 3 and showing their relative placement on a specimen to be tested.

Referring to FIG. 4 it will be seen that the axis of expansion and contraction of active gauge 13 is aligned with the axis 29 along which specimen elongation is to be measured, and that the dummy gauges 14 and 15 are parallel and disposed normal to axis 29. As indicated in the case of the first embodiment of the present invention, the dummy gauge arrangement illustrated in FIG. 4 is preferable in those instances wherein specimen elongations in the direction of axis 29 are substantially greater than elongations transversely thereof, since the dummy gauges are insensitive to elongations other than along their axis of expansion and contraction. However, the practice of the present invention is not limited to the dummy gauge arrangment shown, since by employing a material of sufficiently high plasticity to attach dummy gauge 14 and plate 26 to the surface of specimen 9, the dummy gauges may be mechanically isolated within the range of specimen elongation expected to be encountered.

Considering the above, it will be apparent that when specimen 9 is subjected to both thermal and mechanically induced stress, active gauge 13 will sense thermally and mechanically induced expansions or contractions of the surface of specimen 9, dummy gauge 14 will be insensitive to such thermally or mechanically induced expansions or contractions, and dummy gauge 15 will sense thermally induced expansions or contractions of plate 26 but be independent of mechanically induced expansions or contractions of the surface of specimen 9. Due to the direct thermal contact of dummy gauges 14 and 15 with the surface of specimen 9, such gauges will undergo thermal expansion and contraction as a function of the temperature thereof at the same rate as the adjacently disposed active gauge undergoes these same thermal effects. Thus, it will be apparent that effects due to change in electrical resistance of the gauges caused by the changing thermal environment of the test specimen may be cancelled.

Accordingly, it will be seen that the voltage output $V_2$ across terminals 21 and 23 corresponds to the mechanically induced elongation of the surface of specimen 9, and that voltage output $V_3$ across terminals 22 and 23 corresponds to the thermally induced elongation of specimen 9. The voltage output across terminals 21 and 22 corresponds to the total elongation of specimen 9 along axis 29 due to both thermal and mechanically induced stress.

Although various types of strain gauge elements may be employed in the practice of the present invention, solid state strain gauges are preferred because of their high sensitivity. Specifically, I have found that for testing complex structural specimens, such as aluminum honeycomb solid state strain gauges, such as PO 1–16–350 gauges manufactured by Micro Systems Inc., are preferred since such gauges have a thermal coefficient of linear expansion of an order of magnitude lower than that expected for the composite structure to be tested. In accordance with accepted strain gauge practice, I chose gauges from the same gauge lots to insure substantially similar thermal-electrical characteristics.

From the foregoing, it will be apparent that the several embodiments of the present invention represent a substantial improvement over strain gauge techniques of the prior art. By the use of a technique of the first embodiment of the present invention thermally induced elongations of a specimen in the absence of mechanically induced stress may be measured. Further, the simplified mode of attaching the several strain gauges directly to the surface of the specimen facilitates testing of a structurally complex specimen simultaneously at a plurality of points. By the utilization of the technique of the second embodiment of the present invention a specimen may be tested simultaneously at a plurality of points to obtain at each point independent measurements of elongation due to both thermal and mechanically induced stresses.

What is claimed is:
1. Apparatus for measuring the thermal distortion of a specimen comprising:
  a first, second and third strain gauge, each said gauge having two terminals;
  a highly thermally conductive bonding means, said bonding mean affixing said first gauge to said specimen, said specimen having thermally and mechanically induced stresses simultaneously induced therein;
  a plastic highly thermally conductive adhesive means;

a supporting member of substantially identical thermal coefficient of expansion as said specimen, said supporting member being coupled by said plastic highly thermally conductive adhesive means to said specimen;

said bonding means further affixing said second gauge to said supporting member;

said third gauge being coupled by said plastic highly thermally conductive adhesive means to said specimen;

first, second and third balancing resistors, each of said resistors having two terminals, one terminal of said first balancing resistor being connected to one terminal of said first gauge at a first output port, one terminal of said second balancing resistor being connected to one terminal of said second gauge at a second output port, one terminal of said third balancing resistor being connected at one terminal of said third gauge at a third output port, the second terminal of said gauges being connected together at a first tie point the second terminals of said resistors being connected to a second tie point, said first and second tie points being adapted to receive an excitation voltage;

whereby said output ports are adapted to provide a plurality of simultaneous differential output voltages, said differential voltages between said first and second output ports being a representation of mechanical stress, said differential voltage between said first and third output ports being a representation of mechanical and thermal stress, and said differential voltage between said second and third output ports being a representation of thermal stress.

2. A thermal distortion measuring apparatus as defined in claim 1 wherein each said gauge has an axis of sensitivity, said first gauge being bonded to said specimen with said axis of sensitivity aligned in the direction of the thermally induced elongation to be measured, said second and third gauges being positioned parallel to each other but perpendicular to the direction of alignment of said first gauge; and said plastic highly thermally conductive adhesive means having substantially identical heat conductive properties as said bonding means.

References Cited

UNITED STATES PATENTS 2,503,304    4/1950    Stainback _____ 73—88.5
2,344,642    3/1944    Ruge.

OTHER REFERENCES

The Strain Gage Primer, by Perry and Lissner, 1962, McGraw-Hill Inc., p. 62.

RICHARD C. QUEISSER, Primary Examiner

VICTOR J. TOTH, Assistant Examiner